United States Patent [19]

Beltrop et al.

[11] Patent Number: 4,466,761
[45] Date of Patent: Aug. 21, 1984

[54] PNEUMATIC-TUBE CONVEYING INSTALLATION FOR SAMPLES OF FINE MATERIAL

[75] Inventors: Herbert Beltrop, Hamm; Josef Teutenberg, Beckum, both of Fed. Rep. of Germany

[73] Assignee: Krupp Polysius AG, Beckum, Fed. Rep. of Germany

[21] Appl. No.: 303,855

[22] Filed: Sep. 21, 1981

[30] Foreign Application Priority Data

Oct. 8, 1980 [DE] Fed. Rep. of Germany ....... 3038073

[51] Int. Cl.³ ............................................. B65G 51/26
[52] U.S. Cl. ..................................... 406/74; 406/112
[58] Field of Search ........................... 406/74, 110–112

[56] References Cited

U.S. PATENT DOCUMENTS

| | | | |
|---|---|---|---|
| 887,608 | 5/1908 | Duflon | 406/74 X |
| 3,599,898 | 8/1971 | Bontempelli | 406/74 X |
| 3,767,138 | 10/1973 | Martin | 406/74 |
| 3,976,264 | 8/1976 | Ekama et al. | 406/112 |

FOREIGN PATENT DOCUMENTS

| | | | |
|---|---|---|---|
| 1259792 | 1/1968 | Fed. Rep. of Germany | 406/74 |
| 2722865 | 11/1978 | Fed. Rep. of Germany | |
| 2247402 | 5/1975 | France | 406/110 |

Primary Examiner—Jeffrey V. Nase
Attorney, Agent, or Firm—Learman & McCulloch

[57] ABSTRACT

The invention relates to a pneumatic-tube conveying installation in which a tube section accommodating the sample carrier at the despatch and receiving stations is designed to be tilted into a filling or emptying position about an axis extending transversely of its longitudinal axis. A conveying installation such as this is distinguished by its particularly simple construction and operational reliability.

10 Claims, 3 Drawing Figures

PNEUMATIC-TUBE CONVEYING INSTALLATION FOR SAMPLES OF FINE MATERIAL

BACKGROUND OF THE INVENTION

This invention relates to a pneumatic-tube conveying installation for samples of fine material, comprising at least one sample despatch station for filling, closing and despatching sample carriers; a sample receiving station for receiving, emptying and returning the sample carriers to the sample despatch station; a feed tube connecting the sample despatch station to the sample receiving station; a blower designed to generate suction and pressure; and two non-return valves. The blower is associated with one station and the first non-return valve is arranged in that section of the feed tube which is situated between the two stations in the vicinity of the other station. The second non-return valve is arranged at that end of the feed tube which extends beyond such other station. The first non-return valve closes and the second non-return valve opens in the vacuum mode while the first non-return valve opens and the second non-return valve closes in the compressed-air mode.

A pneumatic-tube conveying installation of the type in question is generally laid out in such a way that the sample despatch station is set up in a suitable manufacturing part of a factory where a sampling unit, a sample mixer, a metering unit, etc. are also situated, while the sample receiving station is set up in a suitable place for processing the sample, particularly in a laboratory, so that random samples taken during production may be rapidly delivered to the sample processing department.

To this end, applicants have already developed a pneumatic-tube conveying installation of the above-mentioned type (DE-AS No. 27 22 865) which is distinguished from other known installations by a relatively simple tube system and by structural simplifications both in the sample despatch station and in the sample receiving station. In this pneumatic-tube conveying installation, the tube system may be formed by a single feed tube because the blower is designed to generate both suction and pressure and two correspondingly controllable non-return valves are provided in the feed tube. The various operations involving the sample carriers may be carried out at either station by means of a pivotal arm which may be turned into three different positions so that the three positions "despatch and receive", "open and close" and "fill" of the sample carriers are possible at the sample despatch station, while the three positions "receive and despatch", "open and close" and "empty and clean" are possible at the sample receiving station. The pivotal arm in question is driven by a Maltese-cross drive.

SUMMARY OF THE INVENTION

The principal object of the present invention is structurally to simplify to an even greater extent a pneumatic-tube conveying installation of the type mentioned while at the same time maintaining its operational reliability. According to the invention, this object is achieved in that a tube section accommodating the sample carrier at the despatch and receiving station is designed to be tilted about an axis extending transversely of its longitudinal axis into a filling and emptying position.

Whereas in the known installation the various operations involving the sample carriers, both at the sample despatch station and at the sample receiving station, are carried out by means of a separate pivotal arm, it is sufficient in accordance with the present invention for only one tube section to be made tiltable at either station, the tube section in question optionally being part of the feed tube. Accordingly, this tiltable tube section may be extremely simple in design and it is only necessry to provide one tiltable construction movable into two different positions (filling or emptying position on the one hand and conveying position on the other hand). In this way, it is also possible to reduce the manufacturing costs of the various stations and hence of the pneumatic-tube conveying installation as a whole.

DESCRIPTION OF THE DRAWINGS

Further features of the invention will become apparent from the following description of two preferred embodiments illustrated in the accompanying drawings, wherein.

DETAILED DESCRIPTION

Figure 1:
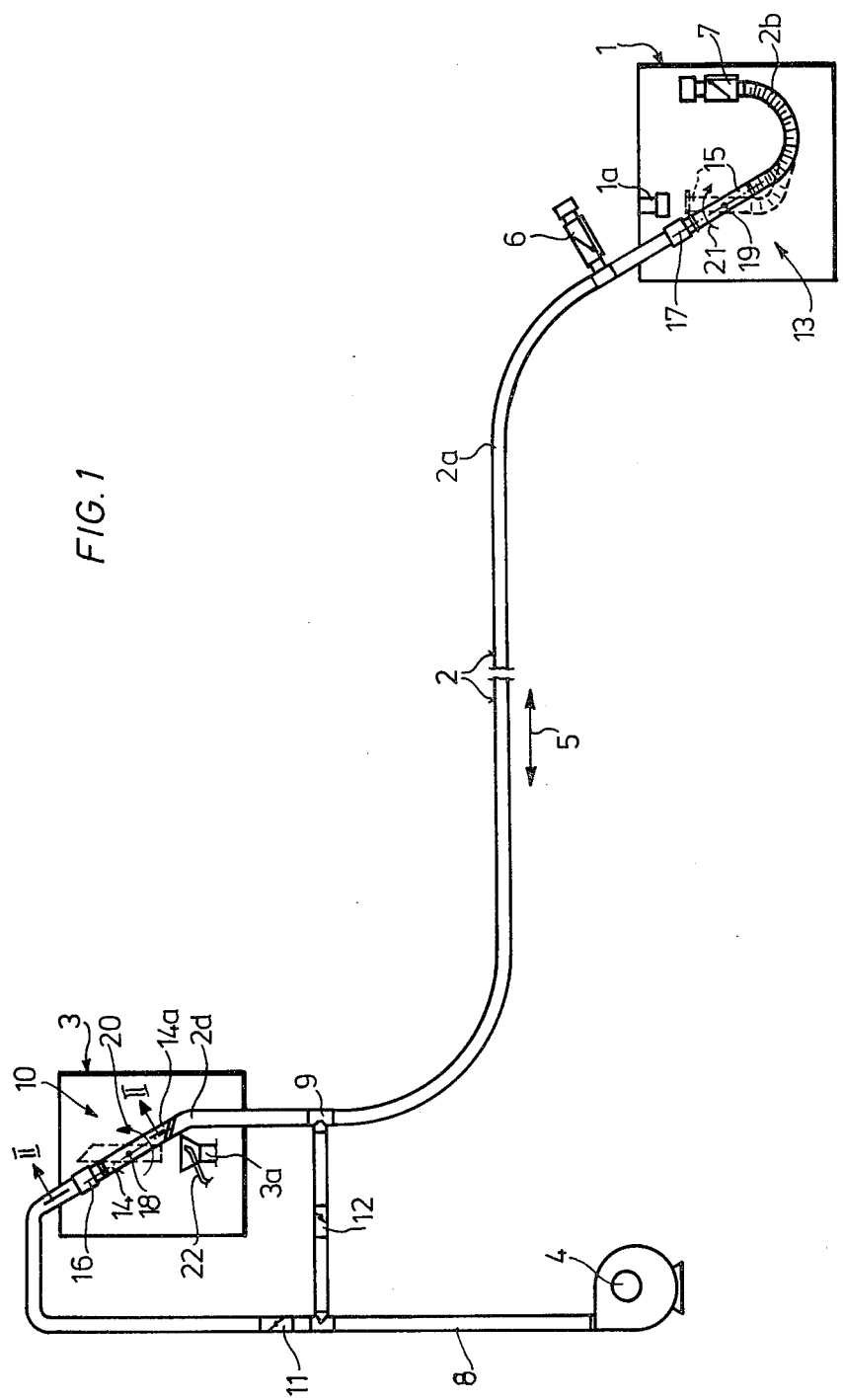
FIG. 1 is a simplified general view of the pneumatic-tube conveying installation.

The general construction and conveying function of the pneumatic-tube conveying installation will be described first of all with reference to FIG. 1.

The function of the pneumatic-tube conveying installation is to convey samples of fine material for example from a manufacturing part of a factory to a sample processing and evaluating department, the samples of fine material being despatched in sample carriers. The pneumatic-tube conveying installation comprises a sample despatch station 1 (hereinafter referred to in short as the factory station) set up in the factory, a single delivery tube 2 and a sample receiving station 3 which is referred to hereinafter as the laboratory station. The delivery tube 2 receives transporting air in both directions (double arrow 5) from a known blower 4 which is designed to generate suction and pressure selectively. The blower 4 is associated with one station, preferably the laboratory station 3, while two non-return or check valves 6 and 7 are provided in the delivery tube 2 in the vicinity of the other station, i.e., the factory station 1. The first non-return valve 6 is situated between the two stations 1 and 3 while the second non-return valve 7 is arranged at that end 2b of the delivery tube 2 which projects beyond the factory station 1 and which is formed by a flexible hose.

The sample carriers to be conveyed from one station to the other are transported in the feed section 2a of the delivery tube 2 which extends between the two stations 1 and 3. Between the blower 4 and the laboratory station 3, there is an air line section 8. In addition, a Tee-piece 9 (connection to the feed section 2a) and adjustable throttle valves 11 and 12 are provided in the air line section, as will be described in more detail in the following. At the laboratory station 3, there is a despatch and receiving stage 10 while the factory station 1 contains a despatch and receiving stage 13. These two stages will be discussed in more detail hereinafter.

When a full sample carrier is to be conveyed from the factory station 1 to the laboratory station 3, the blower 4 is switched to the vacuum or suction mode. At the same time, the second non-return valve 7 opens and the first non-return valve 6 closes (automatically). A sample carrier prepared at the despatch and receiving stage 13 of the factory station 1 is then conveyed in the vacuum mode to the despatch and receiving stage 10 of the laboratory station. As it approaches the laboratory station 3, the sample carrier is decelerated by corresponding adjustment of the throttle valves 11 and 12 in the air line section 8 to form a cushion of air. It is only after the sample carrier has arrived at the despatch and receiving stage 10 that the blower 4 is switched off.

If, conversely, an empty sample carrier is to be returned from the laboratory station 3 to the factory station 1, the blower 4 is swtiched to the pressure mode. However, the blower 4 is preferably only switched on after the empty sample carrier put in at the despatch and receiving stage 10 of the laboratory station 3 has dropped down by gravity and substantially passed the T-piece 9. Under the effect of the pressure generated by the blower, the first non-return valve 6 is automatically opened while the second non-return valve 7 is closed. The sample carrier then travels at full speed to the first non-return valve 6 after which it is suddenly decelerated because the remainder of the delivery tube section is completely closed by the second non-return valve 7. The sample carrier may then slowly enter the factory station 1 up to the despatch and receiving stage 13.

In order to be able to carry out the various operations involving the sample carriers at one of the abovementioned stations, each station comprises at its despatch and receiving stage 10;13 a tube section 14;15 which accommodates the sample carrier and which is designed to be tilted about a shaft 18;19 extending transversely of its longitudinal axis 16;17 into a filling and emptying position. In the embodiment shown in FIG. 1, the tube section 14 in the laboratory station 3 is designed to be tilted anticlockwise in the direction of the arrow 20 while the tube section 15 in the factory station is designed to be tilted clockwise in the direction of the arrow 21 so that the corresponding filling or emptying position may be reached.

In addition, the factory station 1 comprises a filling unit 1a which, in the filling position of the tube section 15 shown in chain lines, aligns axially with that tube section 15, while at the laboratory station 3—below the tiltable tube section 14—there is an emptying funnel 3a which is aligned in the chain-line emptying position of the tube section 14 and which in addition may be equipped with a compressed air line 22 for cleaning an emptied sample carrier.

The construction of a feed tube section in which a tiltable tube section is arranged will now be described with reference to FIG. 2. Since the arrangement and operation of the tiltable tube sections at the factory and laboratory stations is in principle the same, only the construction in the vicinity of the laboratory station 3 will be described in detail while any differences in the factory station 1 will be additionally explained.

Figure 2:
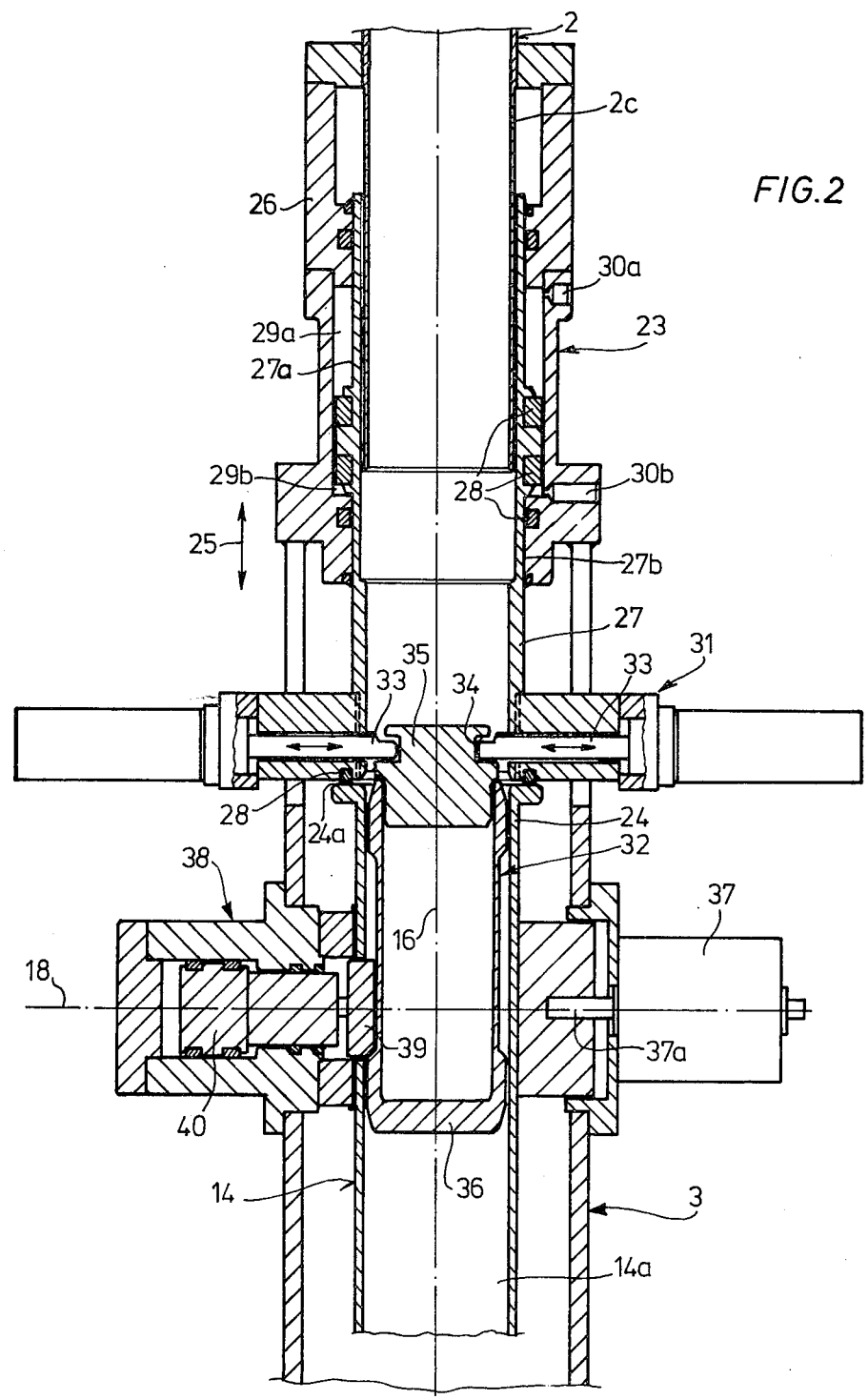
FIG. 2 is a partial section substantially along the line II—II in FIG. 1 illustrating the construction of that part of the feed tube which contains the tiltable tube section.

FIG. 2 shows first a pneumatic seal 23 for the delivery tube 2 (in the upper half of the drawing) which is arranged on a fixed part 2c of the delivery tube. This pneumatic seal 23 comprises a tubular part 26 which is fixedly connected to the fixed tube section 2c and an inner tubular part 27 sealingly accommodated therein to slide in the direction of the double arrow 25. In the feed mode of the delivery tube 2, the slidable part 27 of the seal is pressed pneumatically downwards against the straight end, i.e., cut off at a right-angle to the longitudinal axis 16, of the tiltable tube section 14 which faces it so that a dust-tight seal is formed here. Between the two parts 26 and 27 of the seal, several matching ring seals 28 are inserted at appropriate places. The outer peripheral sides 27a, 27b of the inner part 27 of the seal, which are in sliding engagement with corresponding inner peripheral sections (sealing sections) of the outer part 26 of the seal, are preferably chromium-plated and polished sliding surfaces which ensure satisfactory sliding in the axial direction. Arranged in the vicinity of these sliding contact zones 27a and 27b are chambers (indicated for example at 29a and 29b) to which compressed air may be admitted and which are connected to compressed-air connections 30a and 30b of which for example the upper compressed air connection 30a is designed to receive compressed air for the purpose of lowering the inner part 27 of the seal while the lower compressed air connection 30b receives compressed air for the purpose of lifting the inner part 27 of the seal. In a sealing engagement, the sealing ring 28 projecting axially from the lower free end of the inner part 27 of the seal bears firmly against the axial peripheral surface 24a facing it of the corresponding end 24 of the tiltable tube section 14.

In addition, a cap remover 31 is fixed to that part 27 of the seal which is pneumatically displaceable relative to the tiltable tube section 14. Accordingly, this cap remover 31 is displaced in the direction of the double arrow 25 when the pneumatic seal is established and broken. The cap remover 31 comprises cap engaging elements which are movable transversely of the sample carrier 32 and which, in the present case, are in the form of pneumatically operable slides 33. These slides 33 engage in a peripheral groove 34 in the cap 35 which closes the openings of the sample carrier 32, i.e., the upper end in FIG. 2.

So far as the construction of the tiltable tube section 14 is concerned, it is pointed out at this juncture with reference to FIG. 1 that this tube section 14 is cut off obliquely at one end, i.e., its lower end 14a, where it fits sealingly together with a correspondingly obliquely cut part 2d of the delivery tube 2, the oblique surface thus formed of the section 2d of the delivery tube facing in the tilting direction (arrow 20) of the tube section 14. FIG. 2 also shows that the lower part 14a of the tube section 14 having the obliquely cut end accommodates the base 36 of the sample carrier.

The (geometric) tilting axis 18 is shown in dash-dot lines in FIG. 2 in the middle longitudinal section of the tube section 14. The tube section 14 is designed to be tilted about this axis 18 by means of a controllable drive motor 37 which has not been shown in detail. This drive motor 37 may be mounted on a fixed part of the laboratory station 3 while its driven shaft 37a is fixedly connected to the tiltable part 14 (as indicated in the drawing). The tube section 14 may be tilted from a normal position in which it extends in coaxial prolongation of the delivery tube 2 to a position in which its opposite ends extend beyond the confines of the tube 2 to enable free passage of the sample to and from the carrier.

A sample carrier 32 arriving at the despatch and receiving stage 10 of the laboratory station 3 is immediately engaged and held fast (automatically in the correct position) by a carrier clamping mechanism 38 which also remains in operation during the tilting of the tube section 14 and is only inactivated for the purpose of returning the sample carrier 32—in this case empty—to the other station. In the illustrated embodiment, the carrier clamping mechanism 38 is provided in the vicinity of the tilting axis 18 of the tube section 14. The mechanism 38 comprises at least one clamping element 39 movable transversely of the longitudinal axis 16 of the tube section 14 and a cylinder-and-piston unit 40 by which this clamping element is moved. As shown in the drawing, the clamping element may be fixed to the piston rod of the cylinder-and-piston unit 40 or to part of the piston of the unit 40.

When, therefore, a full sample carrier 32 has travelled from the factory station 1 to the laboratory station 3 and has been clamped fast in the correct position in the tube section 14 by means of the mechanism 38, the cap remover 31 is first moved into its engagement position and then raised together with the pneumatic seal 23 so that, at one and the same time, the tube seal is broken and the closure cap 35 is removed from the carrier 32. The tube section 14 is then tilted anticlockwise (arrow 20) so that the material accommodated in the sample carrier 32 may be shaken out. It can clearly be seen from FIG. 1 that the delivery tube extends obliquely in the vicinity of the laboratory station 3 so that, after the corresponding tilting movement, the tube section 14 extends substantially vertically, thus guaranteeing complete emptying of the sample carrier 32. After the sample carrier 32 has been cleaned (by means of compressed air from the compressed air line 22), the tube section 14 tilts back into its conveying position (against the arrow 20) in such a way that its lower end 14a enters into satisfactory sealing engagement with the tube section 2d (oblique surfaces), after which—again at one and the same time—pneumatic tube seal is activated with respect to the tube section 14 and the closure cap 35 is applied to the carrier. After the cap engaging elements (slides 33) have been released and the carrier clamping mechanism 38 loosened, the sample carrier 32 may be returned to the factory station 1 in the manner described above.

With regard to the differences between the tiltable tube section 14 of the laboratory station 3 and the tiltable tube section 15 of the factory station 1 in terms of construction and function, reference is made in particular to the diagrammatic illustration in FIG. 1. As shown in FIG. 1, the lower end of the tube section 15 is connected by a flexible hose (tube end 2b) so that the tube section 15 may be turned clockwise into its filling position, as shown in chain lines. The tilting drive, the pneumatic tube seal, the cap remover and the carrier clamping mechanism may otherwise be constructed in the same way as in FIG. 2.

It is pointed out at this juncture that an emptying position as shown in chain lines (substantially vertical emptying position) in FIG. 1 with regard to the tube section 14 (laboratory station 3) is of advantage above all for samples of fine granular or powder-form material. If, however, more fluid solid samples, for example samples of steel, are to be conveyed in and subsequently emptied from a sample carrier, it may be sufficient for the tube section 14 only to be tilted into a suitable inclined position which may deviate by up to about 30° from the vertical position.

In an embodiment of the type described in the foregoing with reference to FIGS. 1 and 2, automatic sampling and conveying may be achieved with considerable advantage because the sample carriers may be filled, despatched, emptied and returned without any need for intervention on the part of the operator, for which purpose conventional control systems may be used.

For more simple applications, however, it may be sufficient for filling of the sample carriers on the one hand and their emptying on the other hand to be carried out manually. For applications such as these, the tiltable tube section may of course be simpler in design, as will now be described in detail with reference to FIG. 3.

It will be assumed that, even where the tube section is manually tiltable, conveying takes place in otherwise the same way as described in the foregoing with reference to FIG. 1. For this reason, the delivery tube 2' is shown only with its sections 2'a and 2'b in FIG. 2.

Figure 3:
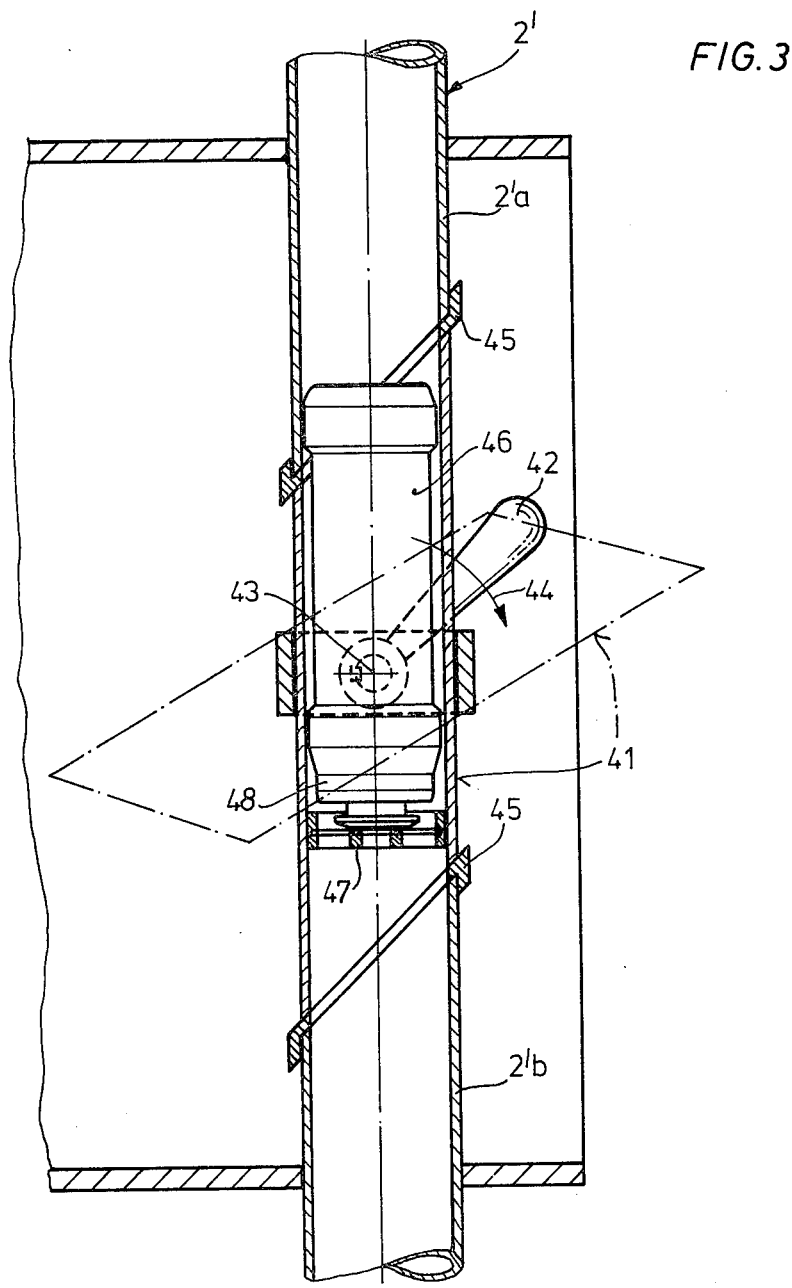
FIG. 3 is a partial section in the vicinity of the tiltable tube section illustrating a second embodiment which is particularly suitable for manual tilting.

FIG. 3 shows that, at their mutually opposite ends, the fixed tube sections 2'a and 2'b are cut off obliquely in the same direction, these obliquely cut ends being separated from one another by a gap which is filled by a tiltable tube section 41 when it is aligned coaxially with the two tube sections 2'a 2'b (i.e., is in the conveying position). This tube section 41 may be manually tilted about the axis 43 in the direction of the arrow 44 (into a filling or emptying position, as shown in dash-dot lines) by means of a lever or handle 42 which has not been shown in detail. To enable this tilting operation to be carried out, not only the mutually opposite ends of the two fixed tube sections 2'a and 2'b, but also the two axial ends of the tube section 41 are cut off obliquely in the same direction. In the conveying position, therefore, the obliquely cut ends of the tube sections 2'a and 2'b may cooperate sealingly to considerable advantage with the correspondingly cut ends of the tube section 41. The sealing effect thus obtained may be further improved by the fact that, as shown in FIG. 3, corresponding ring seals 45 are arranged both on the oblique face of the tube section 2'a and also on the oblique face of the tube section 2'b.

When, in the embodiment illustrated in FIG. 3, a sample carrier has arrived from above in the tiltable tube section 41, this sample carrier 46 is caught and held fast in the position illustrated by a perforated plate 47 or the like. By means of the handle 42, the tube section 41 may be tilted in the direction of the arrow 44 so that the sample carrier 46 may be removed, for example for filling and emptying. Removal of the closure cap 48 from the sample carrier 46 may also be carried out by hand.

The disclosed embodiment is representative of a presently preferred form of the invention, but is intended to be illustrative rather than definitive thereof. The invention is defined in the claims.

We claim:

1. In a pneumatic-tube conveying installation for samples of fine materials, said installation having at least one sample despatch station for despatching a sample carrier, a sample receiving station for receiving the sample carrier, a delivery tube connecting the sample despatch station to the sample receiving station, and pneumatic means for moving a sample carrier through said tube between said stations, the improvement wherein said tube has a section thereof at least at one of said stations for accommodating said carrier, means mounting said one of said sections for tilting movements about an axis extending transversely of its longitudinal axis, and means mounted adjacent at least one of said stations and operable to extend into said delivery tube adjacent said section for removing and replacing a cap from and on said carrier, said means for removing and replacing a cap comprising a pneumatic seal arranged on the delivery tube and including a part displaceable relative to the tiltable tube section in the axial direction of the delivery tube and to which is fixed a cap remover having cap engaging elements displaceable transversely of the delivery tube.

2. An installation according to claim 1 wherein the cap engaging elements comprise pneumatically operable slides.

3. In a pneumatic-tube conveying installation for samples of fine materials, said installation having at least one sample despatch station for despatching a sample carrier, a sample receiving station for receiving the sample carrier, a delivery tube connecting the sample despatch station to the sample receiving station and extending beyond at least one of said stations, and pneumatic means for moving a sample carrier back and forth through said delivery tube between said stations, the improvement comprising a tiltable tube section in at least said one of said stations for accommodating said carrier, said tube section normally occupying a position in coaxial prolongation of said delivery tube and having its opposite ends abutting said delivery tube, means mounting said tube section for tilting movements from and to said positon about an axis between its opposite ends and extending transversely of its longitudinal axis whereby the opposite ends of said tube section may extend beyond the confines of said delivery tube, and means mounted adjacent at least said one of said stations and operable to extend into said delivery tube adjacent said section for removing and replacing a cap from and on said carrier, said means for removing and replacing a cap comprising a pneumatic seal arranged on the delivery tube and including a part displaceable relative to the tiltable tube section in the axial direction of the delivery tube and to which is fixed a cap remover having cap engaging elements displaceable transversely of the delivery tube.

4. An installation according to claim 3 wherein said one of said tube sections is cut off obliquely at one end and fits together sealingly with a correspondingly obliquely cut part of the delivery tube.

5. An installation according to claim 3 wherein said delivery tube has adjacent each of said stations one of said tiltable tube sections.

6. An installation according to claim 3 including a controllable drive motor connected to said tiltable tube section for tilting the latter.

7. An installation according to claim 6 wherein the tiltable tube section includes carrier clamping means.

8. An installation according to claim 7 wherein the carrier clamping means comprises at least one clamping element displaceable transversely of the longitudinal axis of the tiltable tube section and means for displacing said clamping element.

9. An installation according to claim 3 wherein said tiltable tube section has both of its ends cut off obliquely in the same direction to cooperate sealingly with correspondingly cut ends of the delivery tube.

10. An installation according to claim 9 including a lever connected to said tube section for manually tilting the latter.

* * * * *